United States Patent
Hammer et al.

(10) Patent No.: US 6,821,015 B2
(45) Date of Patent: Nov. 23, 2004

(54) CONDUCTED HEAT VECTOR SENSOR

(76) Inventors: Robert Hammer, 664 Beaver Creek Rd., NW., Floyd, VA (US) 24091; Lawrence W. Langley, 2733 Big Falls Rd., Blacksburg, VA (US) 24060

( * ) Notice: Subject to any disclaimer, the term of this patent is extended or adjusted under 35 U.S.C. 154(b) by 0 days.

(21) Appl. No.: 10/055,785

(22) Filed: Jan. 25, 2002

(65) Prior Publication Data
US 2003/0142721 A1 Jul. 31, 2003

(51) Int. Cl.[7] ............................................. G01K 17/08
(52) U.S. Cl. ........................ 374/30; 374/179; 136/225; 136/233
(58) Field of Search ............................. 374/43, 29, 30, 374/208, 179; 136/225, 201, 224, 227, 230, 232, 233

(56) References Cited

U.S. PATENT DOCUMENTS

| | | | | |
|---|---|---|---|---|
| 1,528,383 A | * | 3/1925 | Schmidt | 374/30 |
| 2,493,651 A | * | 1/1950 | Boelter et al. | 136/226 |
| 2,694,098 A | * | 11/1954 | Leins | 136/225 |
| 3,372,587 A | * | 3/1968 | Nanigian | 136/225 |
| 3,599,474 A | * | 8/1971 | Brown et al. | 374/30 |
| 3,607,445 A | * | 9/1971 | Hines | 374/29 |
| 3,648,516 A | * | 3/1972 | Paine | 374/29 |
| 4,245,500 A | * | 1/1981 | Malang | 374/30 |
| 4,541,728 A | * | 9/1985 | Hauser et al. | 374/29 |
| 4,567,365 A | | 1/1986 | Degenne | |
| 4,577,976 A | * | 3/1986 | Hayashi et al. | 374/29 |
| 4,717,786 A | * | 1/1988 | Thery et al. | 136/212 |
| 4,779,994 A | | 10/1988 | Diller | |
| 4,817,436 A | * | 4/1989 | Sallee et al. | 136/225 |
| 4,826,540 A | * | 5/1989 | Mele | 374/208 |
| 4,904,091 A | * | 2/1990 | Ward | 374/179 |
| 5,021,098 A | * | 6/1991 | Burnett | 136/201 |
| 5,048,973 A | | 9/1991 | Liebert | |
| 5,086,204 A | | 2/1992 | Liebert | |
| 5,314,247 A | | 5/1994 | Liebert | |
| 5,360,051 A | | 11/1994 | Takahashi | |
| 5,990,412 A | | 11/1999 | Terrell | |
| 6,084,174 A | * | 7/2000 | Hedengren et al. | 136/201 |
| 6,186,661 B1 | * | 2/2001 | Hevey et al. | 374/29 |
| 6,278,051 B1 | | 8/2001 | Peabody | |
| 6,325,025 B1 | | 12/2001 | Perrone | |

FOREIGN PATENT DOCUMENTS

| | | | | |
|---|---|---|---|---|
| DE | 2758994 A1 | * | 10/1979 | 374/29 |
| SU | 0708179 | * | 1/1980 | 374/29 |

OTHER PUBLICATIONS

"64 Series Heat Flux Transducers for the Direct Measurement of Heat Transfer Rates," Medtherm Corp., Bulletin 118, 6 pages (Mar. 2000).*

High Temp., vol. 9, No. 4, Jul.–Aug. 1971, p. 776.*

Herin and Thery, "Measurements on the thermoelectric properties of thin layers of two metals in electrical contact. Application for designing new heat–flow sensors," Meas. Sci. Technol. 3 (1992), 495–500 (Mar. 1992).*

* cited by examiner

*Primary Examiner*—Christopher W. Fulton
*Assistant Examiner*—Stanley J. Pruchnic, Jr.

(57) ABSTRACT

A sensor designed for measurement of conducted heat flux passing through a solid object consists of a thin film thermopile deposited on a planar substrate whose thermal properties match those of the solid object. The thermopile is protected by a thin rectangular plate made of the same material as the substrate. The sensor is imbedded in the solid object and measures the vector of heat flux along the thermopile axis with minimal distortion of the heat flow pattern. Applications include measurement of heat flux in casting molds, boiler tubes, well surveying instruments and laser weapons testing.

22 Claims, 8 Drawing Sheets

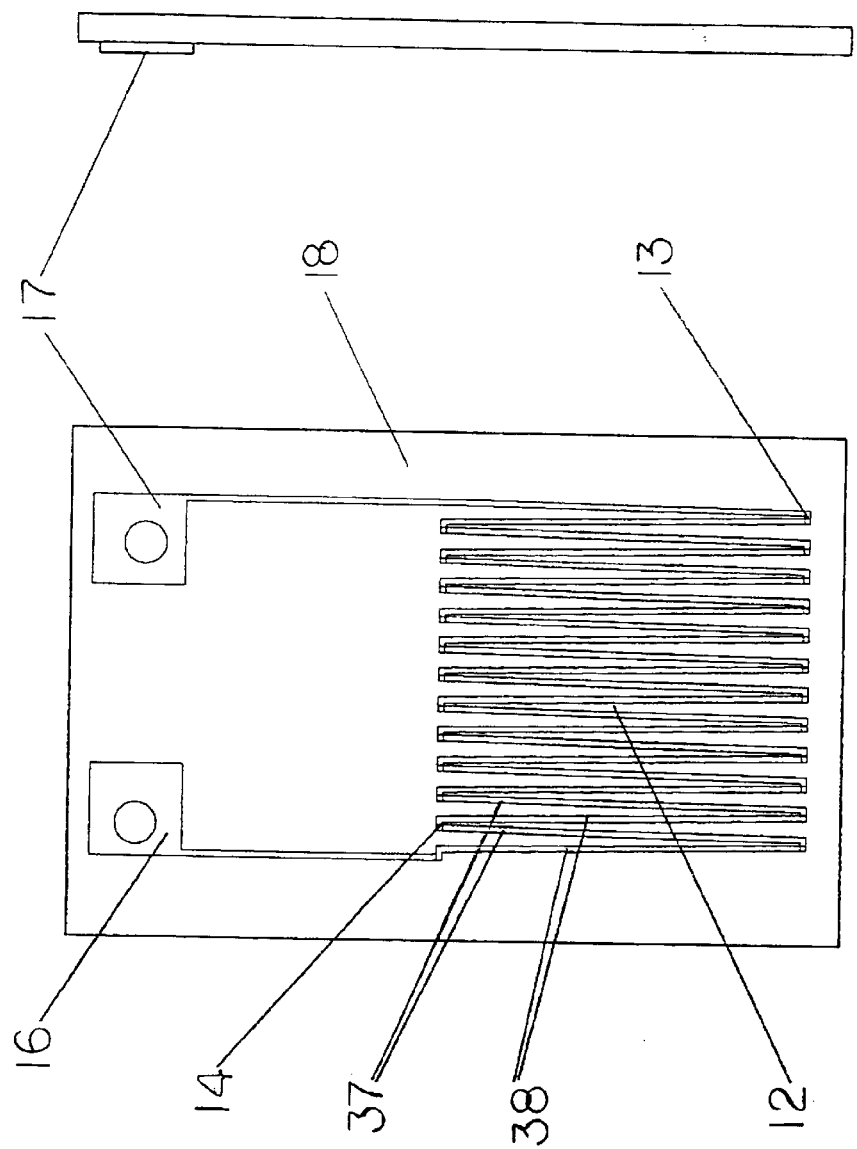

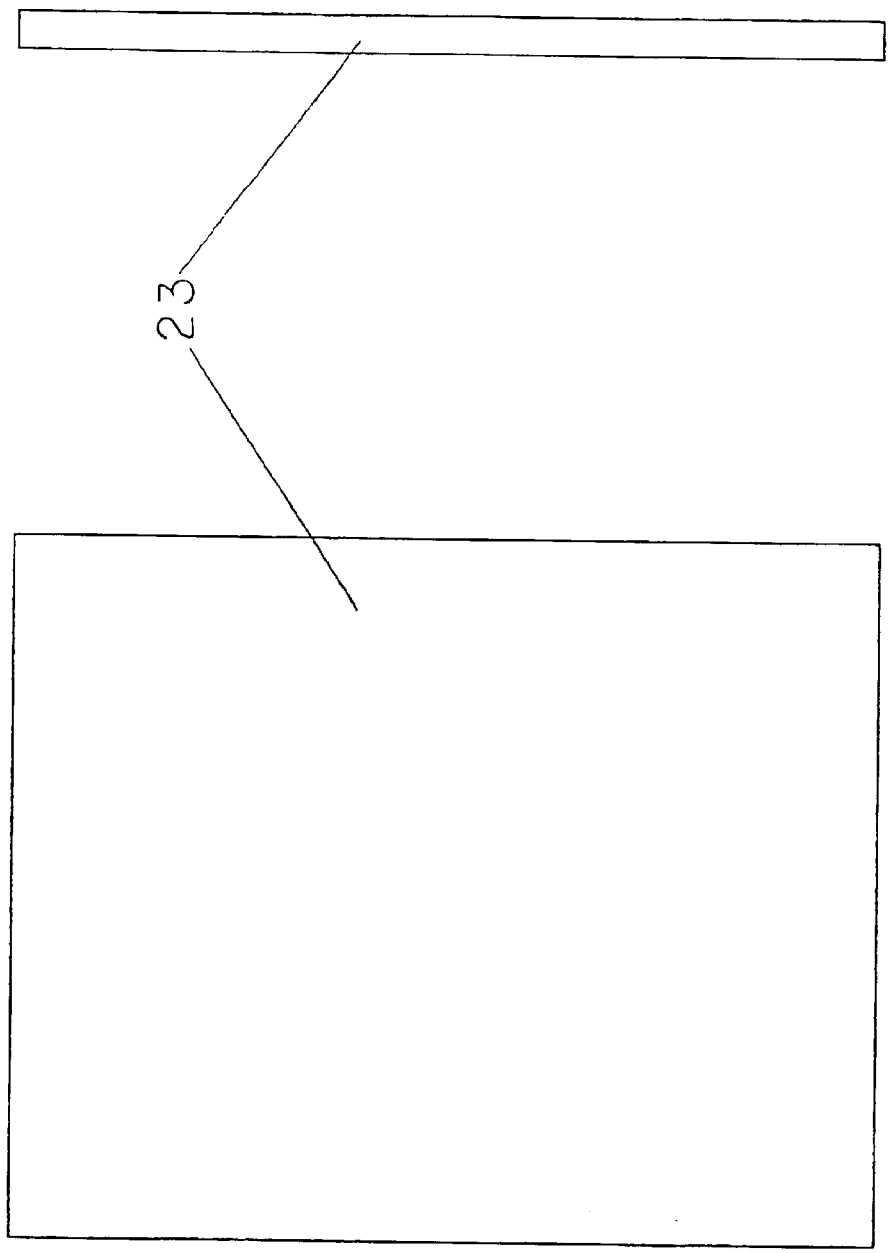

CONDUCTED HEAT VECTOR SENSOR

BACKGROUND OF THE INVENTION

A common requirement in molding and casting processes is to measure the flow of heat from the molded or cast object, through the body of the mold to a liquid coolant or to the outside air. This is a difficult measurement to make, because:

1. most molding and casting processes involve very high temperatures;
2. the casting or molding process environment is extremely dirty, often electrically noisy;
3. molds are typically made of solid metal with high thermal conductivity; and
4. typical commercially available heat flux sensors have low thermal conductivity.

U.S. Pat. No. 5,360,051, issued to Takahashi et al, describes a typical requirement for heat flux measurements in a continuous casting process. The solution offered by the patentee is to embed thermocouples in the wall of the mold. Heat flux through the mold may be calculated from the signals of these thermocouples, which indicate temperatures of the mold body at various points. Heat flux is calculated using measured or assumed values of the mold's thermal properties.

An alternative to the thermocouples of Takahashi et al would be a plug-type heat flux sensor as described by Liebert et al in U.S. Pat. Nos. 5,048,973, 5,086,204 and 5,314,247. The sensor described in these patents is an isolated plug directly machined into the wall of a vessel, optimally by electro-discharge machining, with thermocouples placed at various depths on the outer surface of the isolated plug. Heat flux is calculated from temperature data derived from the thermocouples, using a temperature variant thermal property inverse heat conductive problem method. These calculations of heat flux are extremely susceptible to electrical noise in the thermocouple signals. Any error in locating the thermocouples on the plug surface translates directly into an error in the heat flux calculation. The insulating gap between the instrumented plug and the surrounding material allows the plug temperature profile to depart from that in the surrounding material, depending on conditions at the open end of the plug. This can produce large errors.

An alternative to these methods would be to apply heat flux sensors to the surface of the mold. Such sensors are described in U.S. Pat. No. 4,567,365 issued to Degenne, U.S. Pat. No. 5,990,412 issued to Terrell, and U.S. Pat. No. 6,278,051, issued to Peabody. Heat flux sensors based on the teaching of these patents are commercially available, but they are not suitable for measurements in molding and casting processes. Their attachment to the outer surface of a mold adds a large local thermal resistance which causes heat to be shunted around the area covered by the sensor. The resulting measurements may be inaccurate as well as sensitive to local air currents and other conditions, and the sensors themselves are vulnerable to damage.

Ideally the flow of heat in a casting or molding process would be measured by a thermopile-type heat flux sensor imbedded in the mold itself. However, if the thermal conductivity of such a sensor were greatly different from that of the surrounding material, the pattern of heat flow through the mold would be distorted in the region of the sensor. This would produce a systematic error in the heat flux measurement. Thus it would be important for the sensor's thermal conductivity to nearly match that of the mold. Also, voids or air spaces could not be introduced into the mold when the sensor is installed, because these would produce even more serious distortions of the heat flow in the region of the sensor.

The conventional way to achieve good noise immunity for a thermopile-type heat flux sensor is to raise its output voltage by increasing the temperature drop it introduces into the heat flow path. While this approach is acceptable in radiative heat flux measurements, it cannot be used for conductive heat flux measurements because of the large error it produces. When the thermal conductivity of an imbedded sensor is made approximately equal to that of the mold, the only ways to increase the heat flux signal are by increasing the number of thermocouple pairs or by increasing their physical separation in the direction of heat flow. Space is not often available for the large sensor that would be required.

U.S. Pat. No. 4,779,994, issued to Diller et al, teaches the application of a thin film thermopile heat flux sensor to a surface, for measurement of convective or radiative heat flux through the surface. The output voltage of these sensors is small despite their construction with hundreds of thermocouple pairs, because the thermal resistance they place in the path of heat flow is extremely small. Typically the resistive element consists of one micron ($10^{-6}$ meter) of a ceramic such as silicon monoxide. The thin films of these sensors are vulnerable to damage by abrasion and chemical attack, so they would not be suitable for the molding and casting environment.

SUMMARY OF THE INVENTION

A sensor designed for measurement of conducted heat flux passing through a solid object consists of a thin film thermopile deposited on a plane surface of a thin rectangular substrate. The thermopile is protected by being covered by a thin rectangular plate of the same material as the substrate. The sensor fits tightly in a slot in a threaded plug. For a measurement of heat flux in the solid object the threaded plug is imbedded in the solid object. Thermal properties of the substrate, the plate and the threaded plug match those of the solid object. When heat flows through the solid object the output voltage of the thermopile indicates the magnitude of the heat flux vector along the thermopile axis. Because the thermal properties of the substrate, plate and plug match those of the solid object, there is minimal deviation of the heat flow pattern from that which would have existed without the sensor present. Accurate and precise measurements of heat flux are the result. Applications include measurement of heat flux in casting molds, boiler tubes, well surveying instruments and laser weapons testing.

BRIEF DESCRIPTION OF THE DRAWINGS

FIG. 7 shows the lower plate, with its heat flux sensing pattern of thermocouples.

FIG. 8 shows the upper plate that protects the sensing pattern from abrasion and chemical attack.

DETAILED DESCRIPTION OF THE PREFERRED EMBODIMENT OF THE INVENTION

Figure 1:
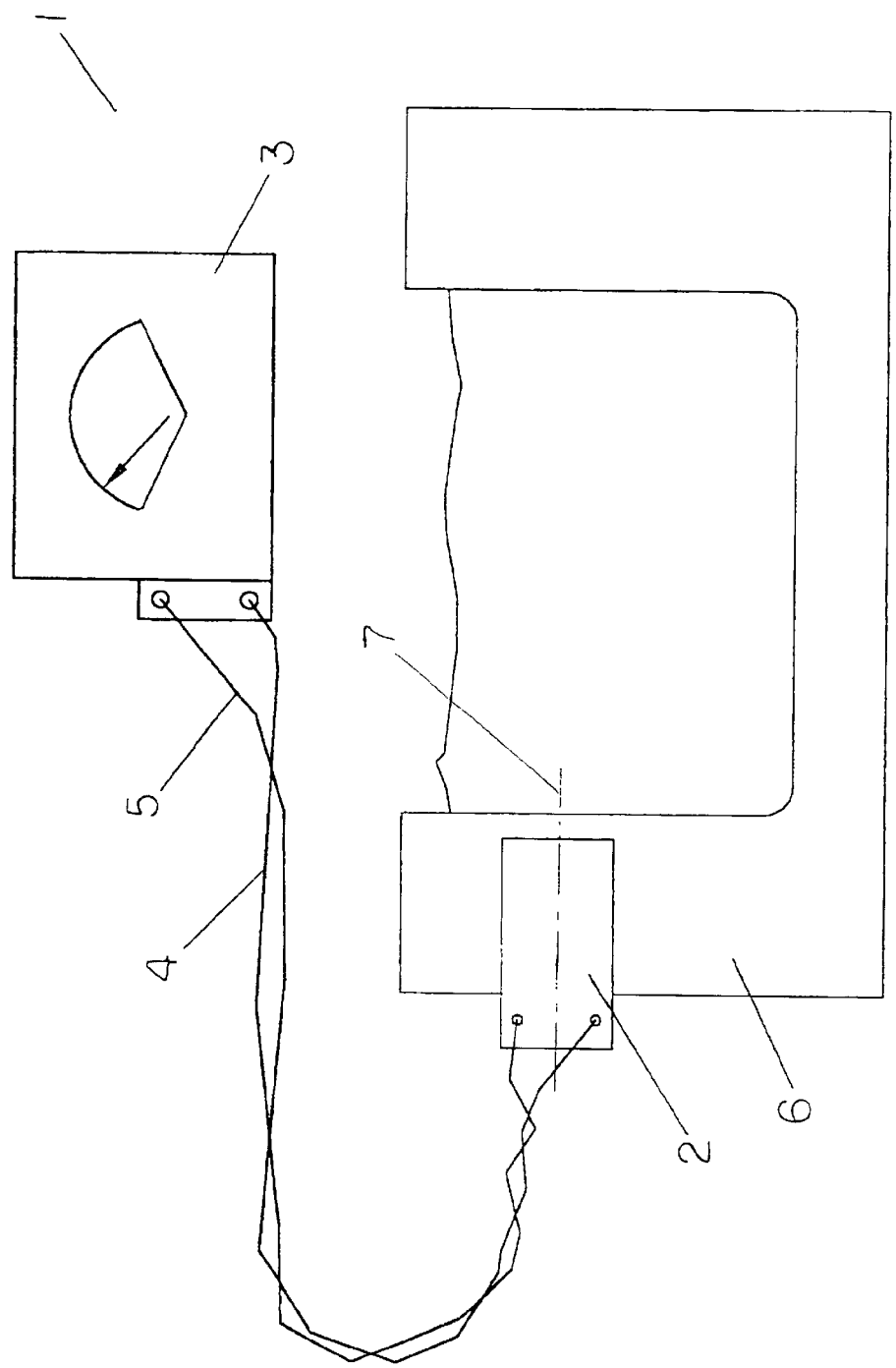
FIG. 1 shows a system for measuring the heat flow in a solid body such as a metal casting mold.

Referring now to FIG. 1, a system 1 for measuring heat flow in a solid body is shown, consisting of a conductive heat transfer sensor 2 and a voltage indicating meter 3, with interconnecting wires 4 and 5. The sensor 2 is installed in a blind hole in a casting mold 6 to measure heat transfer in the body of the mold. The sensor produces a voltage that is proportional to the rate of heat flow per unit area in the direction of the sensor axis 7. This voltage is indicated by the meter 3, whose scale may be graduated in conventional heat flux units such as watts/cm$^2$ or BTU/ft$^2$-sec. In the preferred embodiment of the invention, the thermal conductivity and thermal diffusivity of the sensor materials are nearly equal to corresponding values for the material of the mold itself. When this is so, insertion of the sensor 2 does not change the amount or pattern of heat flow in the mold, and an undisturbed, accurate measurement of heat flow is achieved.

Figure 2:
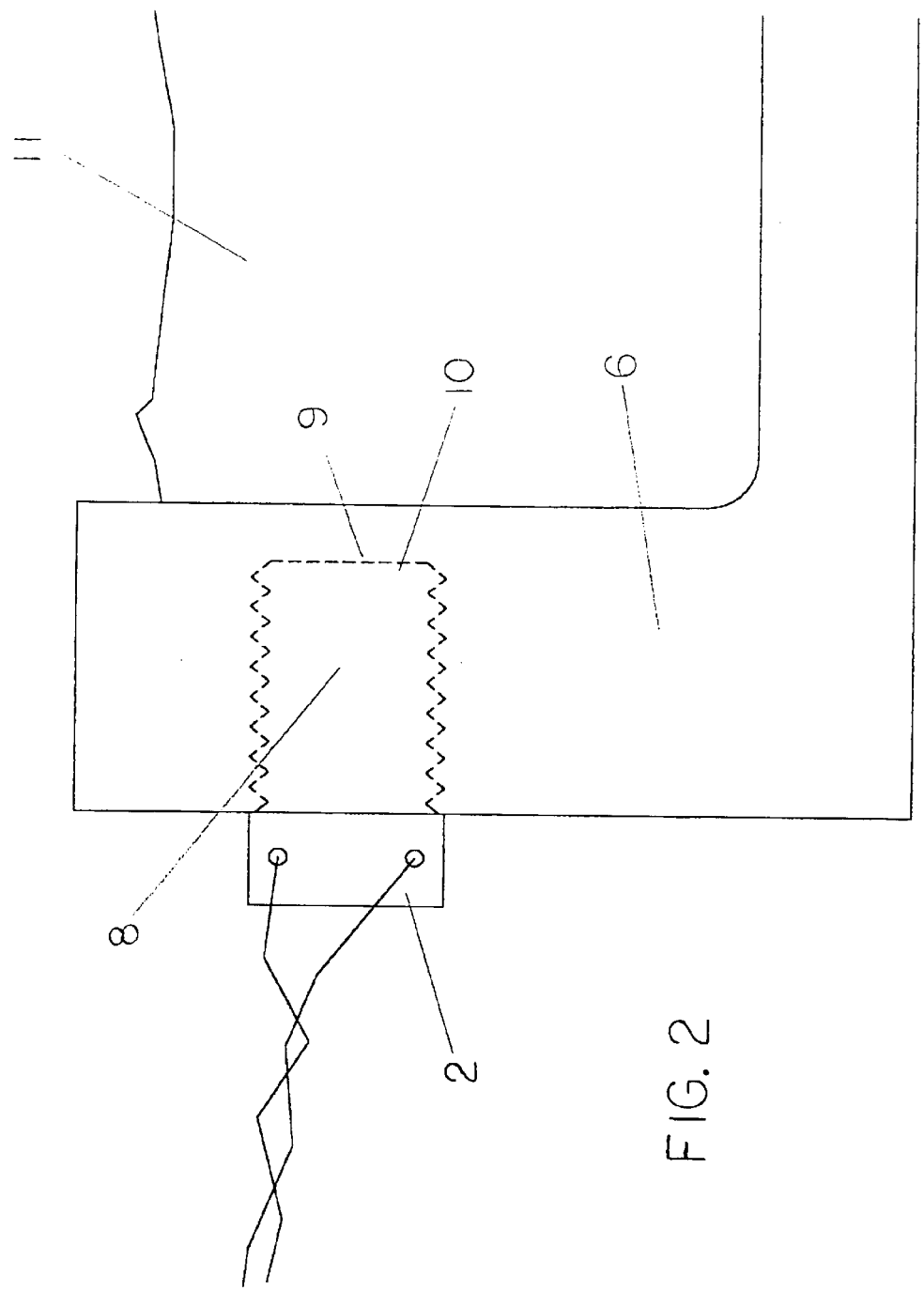
FIG. 2 is a sectional view of a conductive heat transfer sensor installed in a threaded hole in a mold.

FIG. 2 shows how the conductive heat transfer sensor 2 fits into the blind threaded hole 8 in the mold 6. In the preferred embodiment, the hole 8 has a flat bottom 9, and the end 10 of the sensor 2 is also flat. This arrangement results in an area contact between the end of the sensor and the bottom of the hole, facilitating heat transfer from the mold to the sensor with minimum temperature drop. It also minimizes the air space at the end 10 of the sensor.

The blind threaded hole 8 in the mold 6 does not penetrate all the way through the mold cavity 11, so there is no possibility of leakage around the sensor 2 or contact between it and the substance being molded. However there is good thermal contact between the body of the sensor 2 and the mold material surrounding it, so the temperature profile in the mold material is replicated in the sensor. This results in an accurate measurement of heat flux, as though the sensor were not there.

Figure 3:
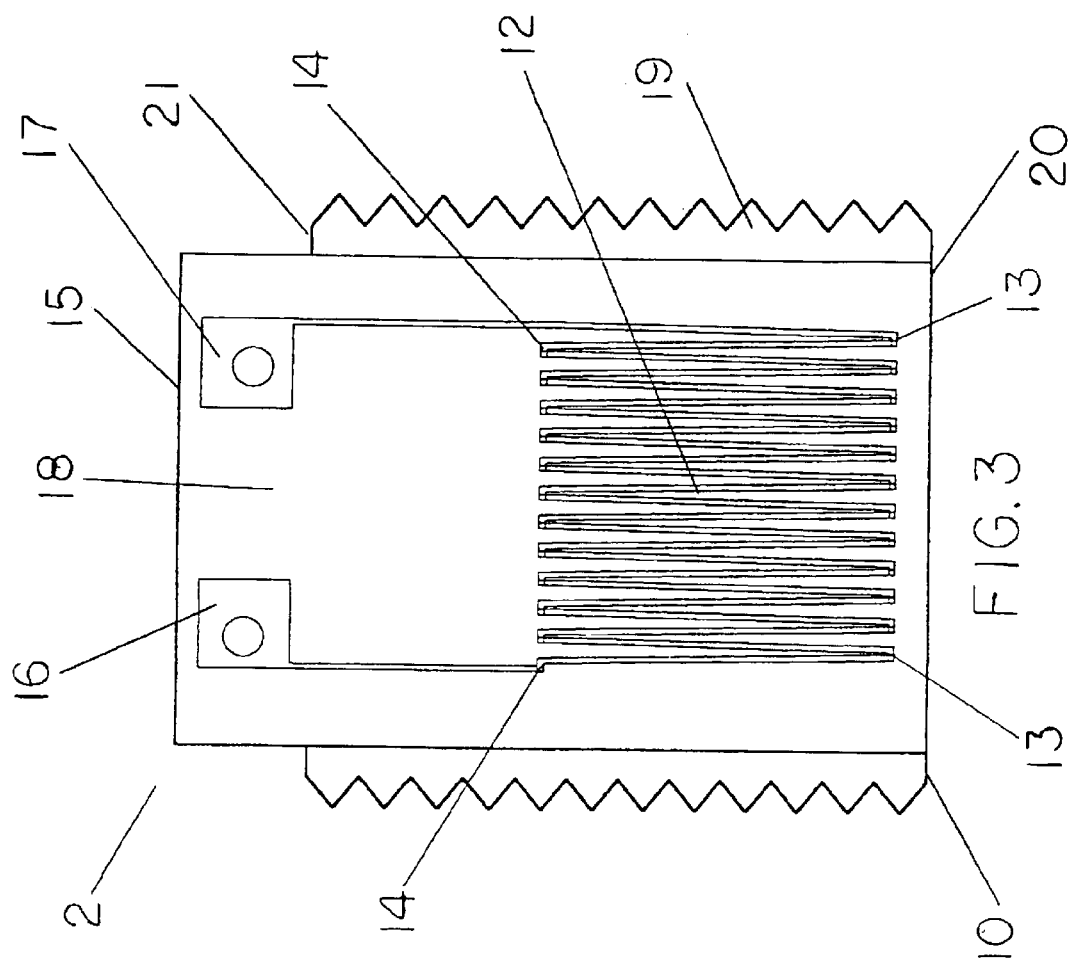
FIG. 3 is a sectional view of a sensor.

FIG. 3 is a sectional view of the sensor 2, showing the thermopile 12 that measures heat flux by indicating the temperature drop in the body of the sensor along the sensor axis. In the preferred embodiment of the invention the thermopile 12 is comprised of thin film thermocouples made up of dissimilar metals. Hot junctions 13 of the thermopile are located near the inner end 10 of the sensor 2, and cold junctions 14 are located near the outer end 15. When there is a temperature drop between the inner and outer ends of the sensor, the thermopile produces a DC voltage across terminals 16 and 17 that indicates the magnitude of the temperature drop, and further indicates the corresponding heat flux. The polarity of this voltage indicates which direction heat is flowing through the sensor. In the preferred embodiment of the invention, the thermopile is deposited by a masked sputtering process on the surface of a thin, rectangular ceramic substrate 18.

The ceramic substrate 18 containing the thermopile 12 is contained in a slotted plug 19. The length and location of the ceramic substrate 18 and its plate (23 in FIG. 6) are such that in combination they completely fill the slot in the plug. In the preferred embodiment of the invention, the end 20 of the substrate is flush with the inner end 10 of the sensor 2. This results in good thermal contact between the ceramic substrate 18 and the bottom 9 of the blind threaded hole, and a minimum temperature drop between the ceramic substrate and surrounding material. The other end of the ceramic substrate may project beyond the outer end 21 of the plug 19, to provide an area for electrical connections, as well as strain relief for wires.

In the preferred embodiment of the invention the material of the ceramic substrate 18 has a thermal conductivity and diffusivity matching the corresponding properties of the mold material. With a good match of material properties among the substrate 18, the plate 23, the slotted plug 19 and the mold 6, the magnitude and pattern of heat flow through the mold are not affected by presence of the sensor, and accurate measurements of heat flux can be made.

Figure 4:
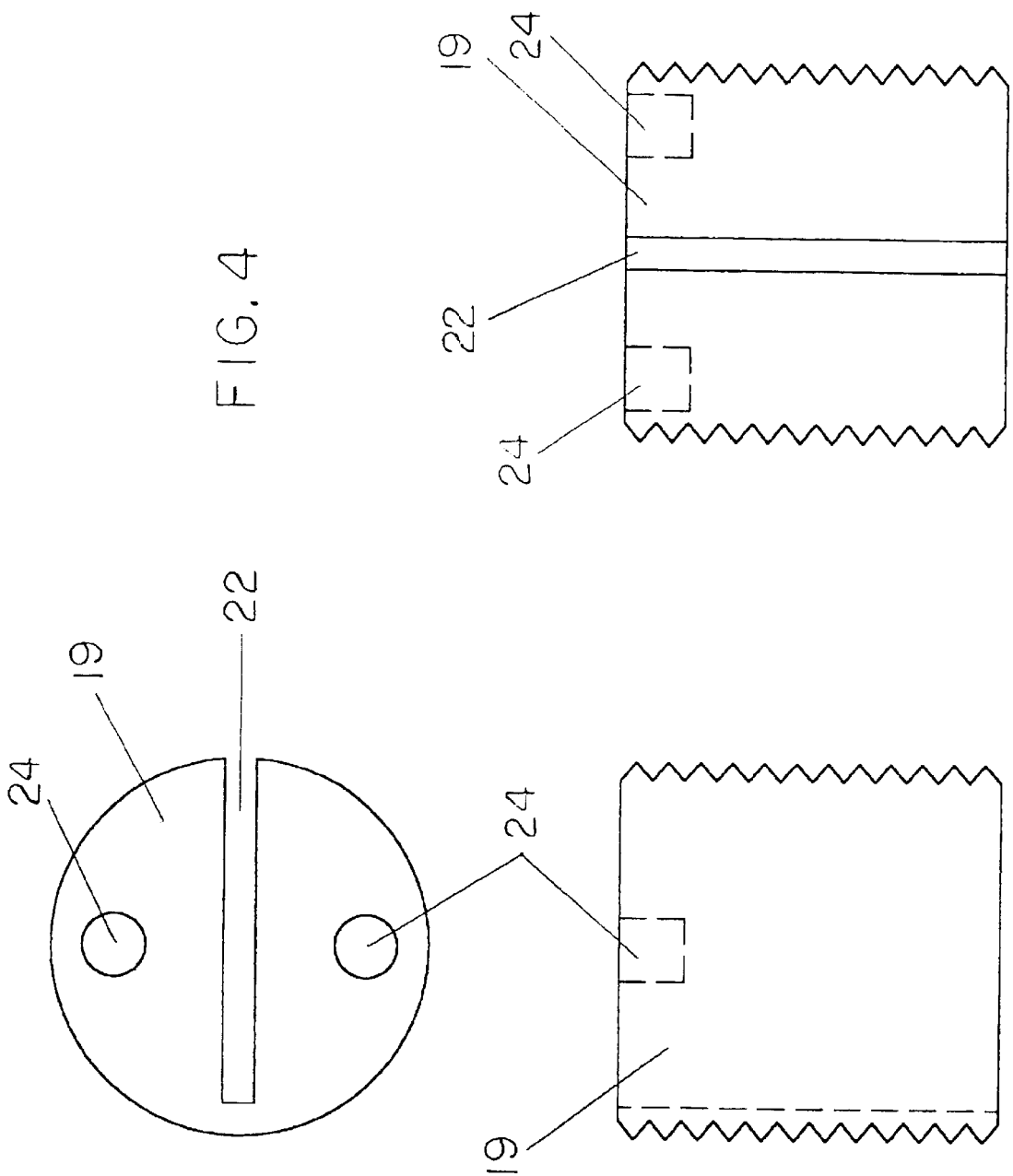
FIG. 4 shows details of the threaded body of the sensor.

FIG. 4 shows details of the slotted plug 19. In the preferred embodiment of the invention this plug is made of the same material as the mold in which it will be inserted. If that material is unmachinable or stock is unavailable in suitable form, a material with the same or similar thermal properties can be substituted, with a possible slight increase in measurement errors. In the preferred embodiment the slot in the threaded plug is made by electro-discharge machining. This method may be employed with virtually any metallic material, and is capable of achieving excellent dimensional accuracy.

Figure 5:
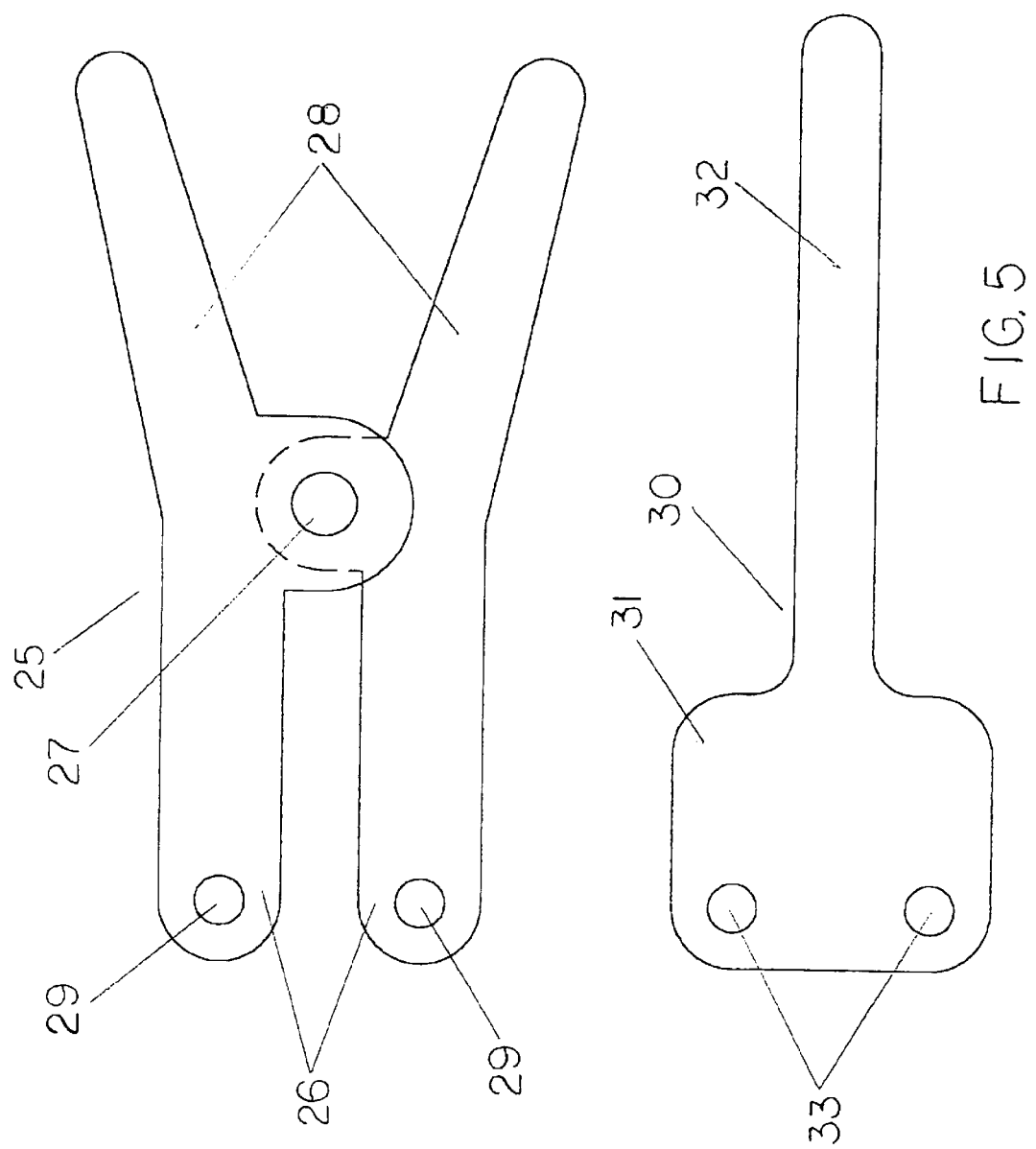
FIG. 5 shows tools for opening the slot in the sensor body to install the sensing substrate and cover, and for tightening the sensor in its blind threaded hole in the mold.

In addition to a slot 22 for the ceramic substrate 18 and its ceramic plate 23, the slotted plug 19 has two cylindrical holes 24 suitable for engagement with pins of a spreader and a wrench. The spreader 25, shown in FIG. 5, is used to open or widen the slot 22 for insertion of the ceramic substrate and plate. This tool consists of arms 26, fastened together by a pivot pin 27, with handles 28 for gripping by a human operator. To spread open the slot of a slotted plug 19 the operator engages the projecting pins 29 with cylindrical holes 24, and squeezes the handles 28 together.

The wrench 30, also shown in FIG. 5, is used to tighten a sensor 2 into its threaded hole in a mold 6. The tool consists of a flat paddle 31 and handle 32, with projecting pins 33 for engagement with cylindrical holes 24 of the sensor 2. To tighten a sensor in the threaded hole in a mold, the operator engages pins 33 with the holes 24, and applies torque to the sensor 2 by turning the handle 32. This tool may be used to tighten or loosen sensors in a mold.

Figure 6:
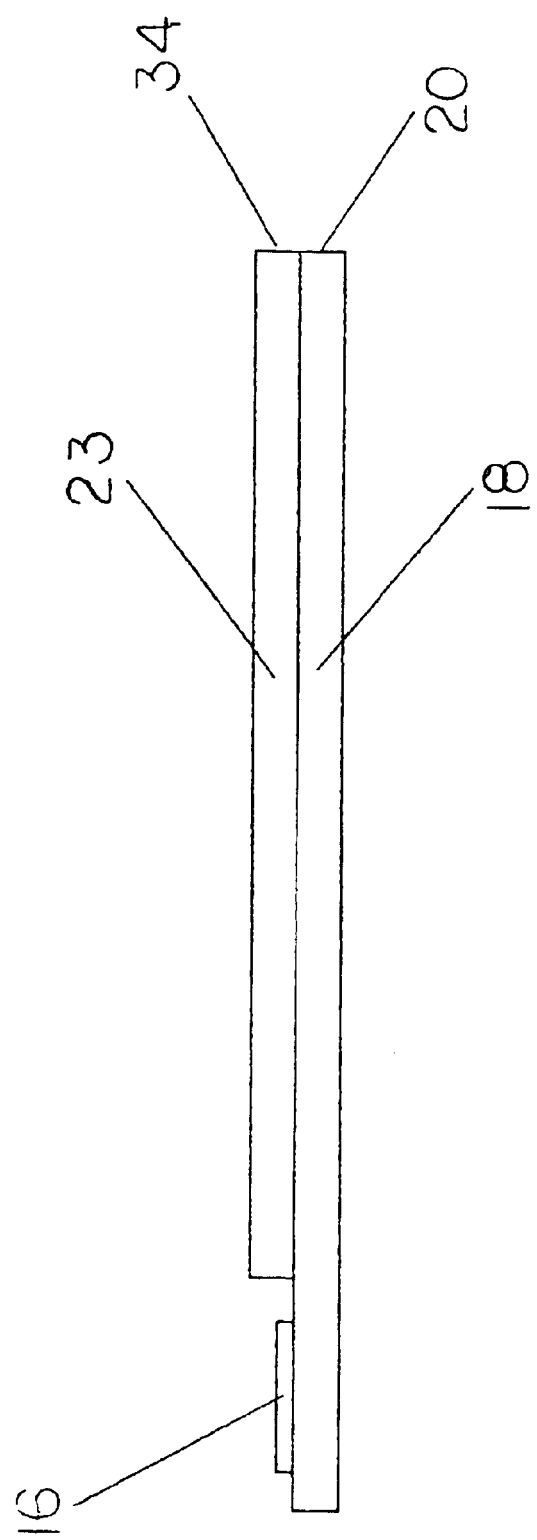
FIG. 6 shows the sensing insert, consisting of two flat plates fabricated from an electrically insulating material.

FIG. 6 shows a ceramic substrate 18 and ceramic plate 23, in a proper relative position for insertion in the slot 22 of a slotted plug 19. The ends 20 and 34 opposite the connection pads 35 are flush with each other so that when they are inserted in the slot 22 they will be flush with the inner end 36 of the slotted plug 2. The plate 23 is shorter than the substrate 18 to provide clearance for making connections to the thermopile and for mechanical protection of those connections.

In FIG. 7, details of the thermopile 12 and its connections are shown. The thermopile 12 is a zig-zag pattern of thin film conductors deposited on the substrate 18. The conductors extend between hot junctions 13 and cold junctions 14. In the preferred embodiment, twelve conductors (two marked 37) are made of a first metal, alternating with twelve conductors (two marked 38), made of a second metal. Hot and cold junctions 13 and 14 are formed by sputtering the first metal through a first aperture mask, then sputtering the second metal through a second aperture mask that overlaps the conductors at their ends. In the preferred embodiment the two metals are selected for their large thermocouple potential. The thermopile produces a voltage across its terminals 16 and 17 that is proportional to the temperature difference between hot junctions 13 and cold junctions 14. This signal is also proportional to the heat flowing from the hot to the cold junctions.

In the preferred embodiment terminals 16 and 17 are deposited as thick films on substrate 18, overlapping the respective thin film conductors. Wires 4 and 5 are welded to these thick films, making connections that have good high temperature performance.

FIG. 8 shows the ceramic plate 23, a flat rectangular solid of the same material as the substrate. Its function is simply to protect the thermopile from abrasion and other potential sources of damage.

Features of the Preferred Embodiment of the Invention

The advantages of the sensor herein described are its ruggedness, environmental tolerance and measurement accuracy. The sensor is rugged because its thin film measuring elements are deposited on a durable ceramic substrate and protected by a durable ceramic plate. They are protected from abrasion and chemical attack by the plate. The ceramic substrate and plate are themselves protected by enclosure within the threaded plug, which is, in turn, completely enclosed in the material of the mold or other solid object. The only part of the sensor that is exposed to possible damage is its connections, and these can be protected by a shield or plate.

The maximum operating temperature for this sensor is limited only by the thermopile and substrate materials. If platinum/platinum-rhodium thermocouple materials are used, and the substrate is made of Zirconia, the sensor should function well at temperatures approaching 1000° C. Other thermopile and substrate material combinations may be utilized at lower temperatures.

The sensor's measurement accuracy results from a good match of thermal properties among the mold material, the material of the threaded plug and the substrate and plate materials, as well as the good thermal contact in all directions among these three parts. In the preferred embodiment the thin film thermocouples and their interconnections on the substrate do not shunt a significant amount of heat away from the substrate because their mass is so small compared to that of other elements of the sensor. They simply indicate the temperature difference on the surface of the substrate. The substrate, in turn, replicates the temperature distribution in the threaded plug because it is in good thermal contact with the material of the plug along its length. The threaded plug replicates the temperature distribution in the mold body, because it is in good thermal contact with the material of the mold along its length. The net result is a differential temperature measurement that accurately represents the heat flux in the mold body.

If the sensor of the preferred embodiment is installed in a solid material with its axis aligned with the flow of heat, it will indicate the total conductive heat flux in the solid. However, if the axis of the sensor is not aligned with the flow of heat, it will indicate the vector component of heat flux parallel to its axis. Thus, two or more of these sensors may be installed in a solid body with their respective axes at normal or other angles to each other, enabling measurement of the heat flux magnitude and direction in the solid body.

Measurement of heat flux with the invention requires no thermocouple compensation. The sensor is self-powered, needing no power supply or other energization, and does not add heat to the mold or other object being measured. When the signal of the sensor is precisely zero, the heat flux, averaged over the sensor area, is also precisely zero.

Variations of the Invention

Having described the preferred embodiment, optional forms of the invention which may be practiced without departing from the scope and spirit of this disclosure will be now be described.

Examples of materials which may be employed in making the substrate and plate of the invention, to achieve accurate measurements of heat flow in molds and other solid bodies are:

For aluminum bodies—Aluminum nitride—Thermal conductivity 170 w/-K

For ferrous bodies—Silicon nitride—Thermal conductivity 5 to 20 w/-K

For ceramic bodies—matching ceramics

For copper bodies—(Diamond) Aluminum nitride

The instrumentation of copper molds and other copper or brass objects requires a compromise in the accuracy objective, because the only other material that can match the thermal conductivity of copper is diamond. To minimize the resulting error, the substrate and plate of aluminum nitride should be made extremely thin. This will help to replicate the temperature distribution of the copper body in the substrate.

Only a few processes are commercially available for application of pinhole-free electrically insulating thin films to metals. However, using one of these processes a metal substrate and plate could be coated, and the ceramic substrate and plate replaced by coated metal equivalents.

Measurement accuracy with such a combination in metal molds would be better than with a ceramic substrate that doesn't quite match the mold material properties. In the case of a copper mold body, a copper substrate would achieve the best possible accuracy.

While the preferred embodiment of the invention is intended for installation in a blind hole in a solid object, there may be situations in which a through hole is the only possible site for installation. For example, the only access to the wall of a pipe may be from the outside. For such an application the slot in the threaded plug of the sensor may be cut from the outer end instead of from the side. This will produce a plug that can be completely sealed at the inner end. The plug might also be made as a simple cylinder and installed by pressing it mechanically into a slightly undersize round hole in the mold or other object. While it could not be removed as easily, this type of plug would measure conducted heat transfer with good accuracy.

The invention may be practiced over a wide range of sizes without loss of accuracy, as long as the match of material thermal properties is maintained. For molds or other solid objects that have thin walls, the length of the plug and substrate may be reduced, although the sensitivity of the resulting sensor will be low.

Thin film thermopiles according to the invention may be formed by physical deposition methods such as sputtering or laser ablative vacuum deposition, or by chemical methods such as electroplating, electroless plating, chemical vapor deposition, laser chemical vapor deposition or by etching a metal-coated substrate. Any means that produces the desired pattern and thickness of metal electrodes can be used.

In the context of the preferred embodiment of the invention, a thin film is generally between 0.5 and 10 microns in thickness. The invention may be practiced with films that are thinner than 0.5 microns, however, with the limitation that the source resistance of the thermopile will be higher and the electrical noise picked up by the thermopile will be greater. Also, the life and durability of the sensor may be less for such thin films. The invention may be practiced with films that are thicker than 10 microns, with the limitation that the thermal conductivity of the substrate will be effectively increased because more heat will be shunted through the thermopile. The actual film thickness to be employed in a given situation is thus a design variable that depends on the material properties of the substrate and cover plate and the dimensions of the sensor.

The materials used for thermocouples in the thermopile of the invention may be pure metals such as copper or nickel, alloys such as constantan or Nichrome, or compounds such as oxides, nitrides, carbides and the like. The only requirements are that thermocouples made from the two materials of the thermopile shall produce a voltage difference that is indicative of temperature, and that they should survive in the application environment.

Connections to the thermopile may be made by processes such as welding, brazing or soldering, with or without intermediate layers such as thick films, conductive adhesives and the like.

Wires (4 and 5, FIG. 1) attached to the sensor for connection to a voltage measuring instrument may be fragile and vulnerable to breakage. Strain relief for these wires can be provided by attaching them to the substrate 18, or by crimping part of the slotted plug over their insulation.

The invention is not limited to plugs that are slotted with a rectangular slot for the substrate and plate combination. The substrate and plate may be half-rounds, with the planar faces of the substrate and plate adjacent to each other. For the most accurate measurements of heat flux, either round or rectangular substrate and plate my be pressed into a hole made directly in the solid object.

The tool for inserting the substrate and plate in the slot in the plug may be as shown in FIG. 5, however, any other practical means for gripping the plug and spreading the slot may be employed. The tool for applying torque to the plug may be as shown in FIG. 5, or any other effective means may be employed for gripping and turning the plug. Holes of any appropriate shape and depth may be provided in the plug for engagement of these tools.

The end of the plug may be flat, as shown in FIG. 4 for the preferred embodiment, or tapered, pointed or round, with a matching shape in the hole machined in the mold, as long as there is a good area of contact between the end of the plug and the bottom of the hole, and the air space between the plug and mold is small. This will insure that the flow of heat from the mold into the plug is unimpeded by thermal resistance, and the pattern of temperatures in the plug is the same as that in the surrounding material.

Applications of the Invention

The principal application of the preferred embodiment of the invention is for instrumentation of heat flux in molding and casting processes, as described in U.S. Pat. No. 5,360,051, issued to Takahashi et al, As in this example, a water-cooled copper mold is used to cool molten steel while forming it into a strip or rod. There is currently no accurate and direct method for measuring the rate of extraction of heat from the molten steel in this process. Using the preferred embodiment of the invention it will be possible to measure heat flow out of the steel into the water at one or more locations in the mold. This measurement will lead to an improved understanding of the molding process and more precise control of product quality.

A second application of the invention is in soot-blowing control, as described in U.S. Pat. No. 6,325,025 issued to Perrone. Here the sensor is used to detect the buildup of soot or other thermally resistive deposits on boiler tubes, and to indicate how effective a soot-blowing operation has been. In this application the sensor of the invention would be imbedded in the tube wall. A decrease in its signal would indicate that soot deposits have built up, and an increase would indicate that soot-blowing has been effective. The combination of durability, high temperature tolerance and large output signal makes the sensor particularly suitable for this application.

In the surveying of drilled holes in the earth such as water wells or oil wells, there is a requirement to measure heat flux passing from the surrounding rock formation into the surveying instrument or drill stem, or from the surveying instrument into the rock. The sensor of the invention is suitable for these measurement, being particularly rugged and insensitive to a high temperature environment. Its signals can be monitored locally, near the location of the sensor, or transmitted to the surface for monitoring and analysis.

A particular application for the preferred embodiment of the invention is in measuring the heat flux produced in a metal shield by laser weapons. To make this measurement a number of sensors are imbedded in the back of the shield, the weapon is fired at the shield, and the signals of the sensors are recorded. Temperatures produced in the front of the shield may be far in excess of the limits of ordinary heat flux sensors.

We claim:

1. A sensor for measuring a vector component or heat flux comprising:

a thin flat substrate plate of thermally conducting, electrically insulating material;

a thin film thermopile deposited on a surface of said substrate plate; and electrical connections on said thin film thermopile for measuring its voltage, wherein said vector component of heat flux is measured on the axis of said thermopile.

2. The sensor of claim 1 further comprising a thin flat cover plate of thermally conducting, electrically insulating material covering said thermopile on said substrate plate.

3. The sensor of claim 2 further comprising a solid body; and means for holding together and imbedding said substrate plate and said cover plate within said solid body.

4. The sensor of claim 3 in which said means for holding together and imbedding said substrate plate and said cover plate within said solid body comprises a threaded plug having a slot for holding said substrate plate and said cover plate together.

5. The sensor of claim 4 in which said slot is formed in the side of said plug.

6. The sensor of claim 4 in which said slot is formed in an end of said plug.

7. The sensor of claim 3 in which said means for holding together and imbedding said substrate plate and said cover plate within said solid body comprises a cylindrical plug having a slot for holding said substrate plate and said cover plate together.

8. The sensor of claim 7 in which said slot is formed in the side of said plug.

9. The sensor of claim 7 in which said slot is formed in an end of said plug.

10. The sensor of claim 3 in which the materials of said substrate plate and said cover plate have thermal properties closely matching those of said solid body.

11. The sensor of claim 3 in which the material of said substrate plate and said cover plate is aluminum nitride.

12. The sensor of claim 3 in which said substrate plate and said cover plate are made of metal having a thin coating of electrical insulating material over at least a part of their surfaces.

13. A sensor for measuring heat flux along an axis within a solid body comprising:

a thin flat substrate plate of thermally conducting, electrically insulating material;

a thin film thermopile deposited on a surface of said substrate plate with hot and cold junction pairs of said thermopile aligned with said axis;

electrical connections on said thin film thermopile for measuring its voltage; and means for imbedding said substrate plate within said solid body.

14. The sensor of claim 13 further comprising a cover plate of thermally conducting, electrically insulating material for covering said thermopile on said substrate plate.

15. The sensor of claim 14 in which said means for imbedding said substrate plate within said body comprise:

a threaded plug having a slot for holding said substrate plate; and a threaded hole in said solid body.

16. The sensor of claim 15 in which said slot is formed in an end of said plug.

17. The sensor of claim 15 in which said slot is formed in the side of said plug.

18. The sensor of claim 14 in which said means for imbedding said substrate plate within said body comprise:

a cylindrical plug having a slot for holding said substrate plate; and a hole in said solid body with diameter suitable for a press fit of said plug into said hole in said solid body.

19. The sensor of claim 18 in which said slot is formed in an end of said plug.

20. The sensor of claim 18 in which said slot is formed in the side of said plug.

21. The sensor of claim 14 in which the materials of said substrate plate and said cover plate have thermal properties closely matching those of said solid body.

22. The sensor of claim 13 in which the material of said substrate plate has thermal properties closely matching those of said solid body.

* * * * *